UNITED STATES PATENT OFFICE 2,556,420

USE OF PENTAVALENT ANTIMONY COMPOUNDS FOR STABILIZING VINYL CHLORIDE RESINS

John K. Fincke, Dayton, Ohio, assignor to Monsanto Chemical Company, St. Louis, Mo., a corporation of Delaware No Drawing. Application April 15, 1948,
Serial No. 21,315

15 Claims. (Cl. 260—45.75)

This invention relates to a method of stabilizing vinyl chloride resins against discoloration upon exposure to ultra violet light. More particularly it relates to improved polyvinyl chloride and vinyl chloride copolymers which remain transparent when exposed to sunlight.

Polyvinyl chloride and copolymers of substantial proportions of vinyl chloride and minor proportions of other monoolefinic compounds become discolored and soft when exposed to the sun, or other sources of ultra violet light. Some vinyl chloride compositions become dark and brittle when subjected to ultra violet light. Although many stabilizing agents have been proposed, few of them are effective over wide ranges of conditions.

The purpose of this invention is to provide a new and useful family of stabilizing agents which are relatively inexpensive. A further purpose of this invention is to provide new vinyl chloride polymers which are resistant to the effects of sunlight for long periods of time.

It has been found that antimony compounds having the following structural formula, $R_3SbX_2$ in which R is a hydrocarbon radical, such as aryl, alkyl, and aralkyl, for example phenyl, butyl, benzyl, propyl, naphthyl and octyl, or the heterocyclic radicals, such as thienyl, and in which X is an acid forming radical, such as chloride, fluoride, nitrate, acetate, benzoate, caprylate, or other monovalent radical. The stabilizing agents are effective in a wide variety of proportions, for example from 0.1 percent by weight to five percent by weight.

The vinyl chloride resins useful in the practice of this invention are polyvinyl chloride, and copolymers of at least 70 percent of vinyl chloride and up to 30 percent of other polymerizable monoolefinic monomers compatible with vinyl chloride, for example vinyl acetate and other vinyl esters of monocarboxylic acids, ethyl maleate, ethyl fumarate and other alkyl esters of maleic and fumaric acids, methyl methacrylate and other alkyl esters of acrylic and methacrylic acids, and vinylidene chloride. These polymers and copolymers may be prepared by any of the well known methods, but the polymerization in aqueous emulsion is generally the most important method of preparation.

The method of stabilizing the vinyl chloride polymers involves merely the incorporation of the pentavalent antimony salts of the type described by any mixing expedient. It is usually conventional to compound the vinyl resins on a roll mill, heated if desired, or a Banbury type mixer. The resins may be compounded with or without plasticizers, depending upon the ultimate use of the resin. If no plasticizer is to be used the stabilizer may be added by mixing it with an emulsion of the resin in water, however in most cases it will be found desirable to use plasticizers, because the uniform distribution of the stabilizing agent by milling and the ultimate fabrication of the polymer are thereby facilitated. Suitable plasticizers for the vinyl resins are dioctyl phthalate, tricresyl phosphate, dibutyl sebacate, the N-dialkylamides of fatty acids, polyesters, complex phosphates, and aliphatic dihydric alcohols modified by interreaction with monobasic fatty acids.

Further details of the practice of this invention are set forth with respect to the following example.

Example

One hundred parts of polyvinyl chloride was blended with 50 parts of dioctyl phthalate and with one part of triphenyl stibine dibenzoate. The composition was blended on a laboratory roll mill for five minutes at 160° C., utilizing a standardized procedure. The resin so produced and a control resin prepared in identical manner without a stabilizing agent were pressed into sheets 0.040 inch in thickness in a compression mold, heated to 160° C. under a pressure of 4,000 pounds per square inch.

The resin samples were subjected to an accelerated weathering test utilizing the National X-1-A Weatherometer in which ultra violet light was generated by a carbon arc and filtered so as to remove all rays less than 2,900 Å. The rotating rack of the Weatherometer passed the samples under a water spray which lasted for eighteen minutes out of each one hundred-twenty. The unstabilized polyvinyl chloride sample became dark, seriously spotted, and tacky in less than one hundred hours. The stabilized samples remained unchanged after two hundred hours of exposure.

Other samples of the stabilized resin were subjected to direct exposure to sunlight in Florida and were not affected by five hundred and forty sun hours.

Although the invention has been described with respect to a specific example, it is not intended that the details thereof shall be construed as limitations upon the scope of the invention except to the extent incorporated in the following claims.

I claim:

1. A vinyl chloride resin stabilized against the effects of ultra violet light which comprises a polymer in which at least 70 percent of the monomeric components is vinyl chloride, said polymer containing intimately dispersed therein from 0.1 to five percent of a compound having the structural formula $R_3SbX_2$, in which R is a radical of the group consisting of alicyclic, aliphatic, and heterocyclic radicals in which X is a monovalent anionic radical.

2. A stabilized vinyl chloride which comprises polyvinyl chloride having intimately dispersed therein from 0.1 to five percent of a compound having the structural formula $RS_3bX_2$, in which R is a radical of the group consisting of alicyclic, aliphatic, and heterocyclic radicals, in which X is a monovalent anionic radical.

3. A stabilized vinyl chloride resin which comprises a copolymer of at least 70 percent vinyl chloride and up to 30 percent of a monomeric substance of the group consisting of vinyl esters of carboxylic acid, alkyl acrylate, alkyl methacrylate, alkyl fumarate, alkyl maleate, and vinylidene chloride, said resin containing intimately dispersed therein from 0.1 to five percent of a compound having the structural formula $R_3SbX_2$, in which R is a radical of the group consisting of alicyclic, aliphatic, and heterocyclic radicals, in which X is a monovalent anionic radical.

4. A vinyl chloride resin stabilized against the effects of ultra violet light which comprises a polymer in which at least 70 percent of the monomeric components is vinyl chloride, said polymer containing intimately dispersed therein from 0.1 to five percent of triphenyl stibine dibenzoate.

5. A stabilized vinyl chloride which comprises polyvinyl chloride having intimately dispersed therein from 0.1 to five percent of triphenyl stibine dibenzoate.

6. A stabilized vinyl chloride resin which comprises a copolymer of at least 70 percent vinyl chloride and up to 30 percent of a monomeric substance of the group consisting of vinyl esters of carboxylic acid, alkyl acrylate, alkyl methacrylate, alkyl fumarate, alkyl maleate, and vinylidene chloride, said resin containing intimately dispersed therein from 0.1 to five percent of triphenyl stibine dibenzoate.

7. A vinyl chloride resin stabilized against the effects of ultra violet light which comprises a polymer in which at least 70 percent of the monomeric components is vinyl chloride, said polymer containing intimately dispersed therein from 0.1 to five percent of triphenyl stibine dichloride.

8. A stabilized vinyl chloride which comprises polyvinyl chloride having intimately dispersed therein from 0.1 to five percent of triphenyl stibine dichloride.

9. A stabilized vinyl chloride resin which comprises a copolymer of at least 70 percent vinyl chloride and up to 30 percent of a monomeric substance of the group consisting of vinyl esters of carboxylic acid, alkyl acrylate, alkyl methacrylate, alkyl fumarate, alkyl maleate, and vinylidene chloride, said resin containing intimately dispersed therein from 0.1 to five percent of triphenyl stibine dichloride.

10. A vinyl chloride resin stabilized against the effects of ultra violet light which comprises a polymer in which at least 70 percent of the monomeric components is vinyl chloride, said polymer containing intimately dispersed therein from 0.1 to five percent of triphenyl stibine diacetate.

11. A stabilized vinyl chloride which comprises polyvinyl chloride having intimately dispersed therein from 0.1 to five percent of triphenyl stibine diacetate.

12. A stabilized vinyl chloride resin which comprises a copolymer of at least 70 percent vinyl chloride and up to 30 percent of a monomeric substance of the group consisting of vinyl esters of carboxylic acid, alkyl acrylate, alkyl methacrylate, alkyl fumarate, alkyl maleate, and vinylidene chloride, said resin containing intimately dispersed therein from 0.1 to five percent of triphenyl stibine diacetate.

13. A vinyl chloride resin stabilized against the effects of ultra violet light which comprises a polymer in which at least 70 percent of the monomeric components is vinyl chloride, said polymer containing intimately dispersed therein a plasticizer and from 0.1 to five percent of a compound having the structural formula $R_3SbX_2$, in which R is a radical of the group consisting of alicyclic, aliphatic, and heterocyclic radicals, in which X is a monovalent anionic radical.

14. A stabilized vinyl chloride which comprises polyvinyl chloride having intimately dispersed therein a plasticizer and from 0.1 to five percent of a compound having the structural formula $R_3SbX_2$, in which R is a radical of the group consisting of alicyclic, aliphatic, and heterocyclic radicals, in which X is a monovalent anionic radical.

15. A stabilized vinyl chloride resin which comprises a copolymer of at least 70 percent vinyl chloride and up to 30 percent of a monomeric substance of the group consisting of vinyl esters of carboxylic acid, alkyl acrylate, alkyl methacrylate, alkyl fumarate, alkyl maleate, and vinylidene chloride, said resin containing intimately dispersed therein a plasticizer and from 0.1 to five percent of a compound having the structural formula $R_3SbX_2$, in which R is a radical of the group consisting of alicyclic, aliphatic, and heterocyclic radicals, in which X is a monovalent anionic radical.

JOHN K. FINCKE.

REFERENCES CITED

The following references are of record in the file of this patent:

UNITED STATES PATENTS

| Number | Name | Date |
|---|---|---|
| 1,969,473 | Murray | Aug. 7, 1934 |
| 2,314,466 | Thwaites | Mar. 23, 1943 |
| 2,434,496 | Houtman | Jan. 13, 1948 |

FOREIGN PATENTS

| Number | Country | Date |
|---|---|---|
| 569,037 | Great Britain | May 2, 1945 |